Aug. 8, 1972  A. V. GROSSE  3,682,775
METHOD FOR HEATING HYDROGEN GAS
Filed Oct. 11, 1968
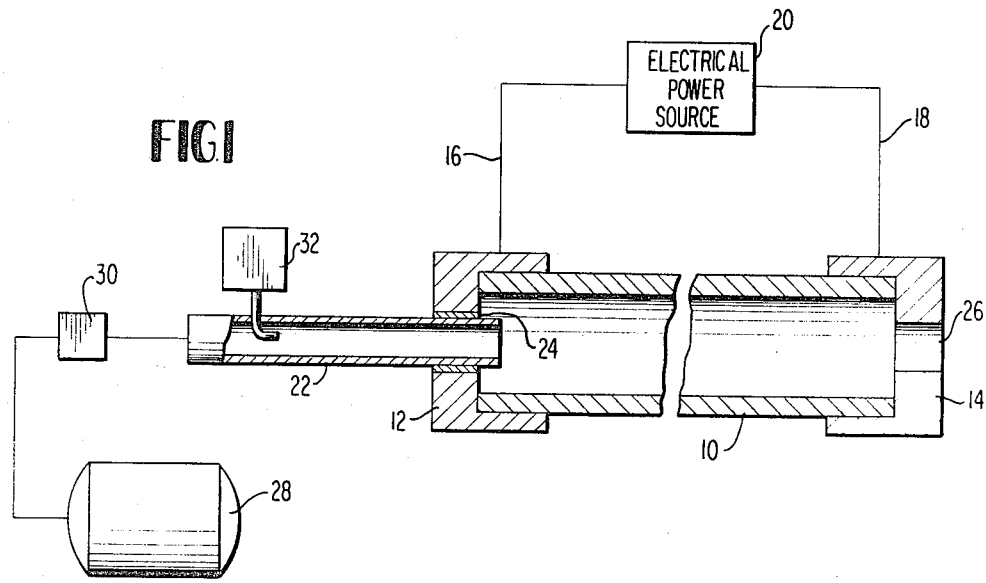
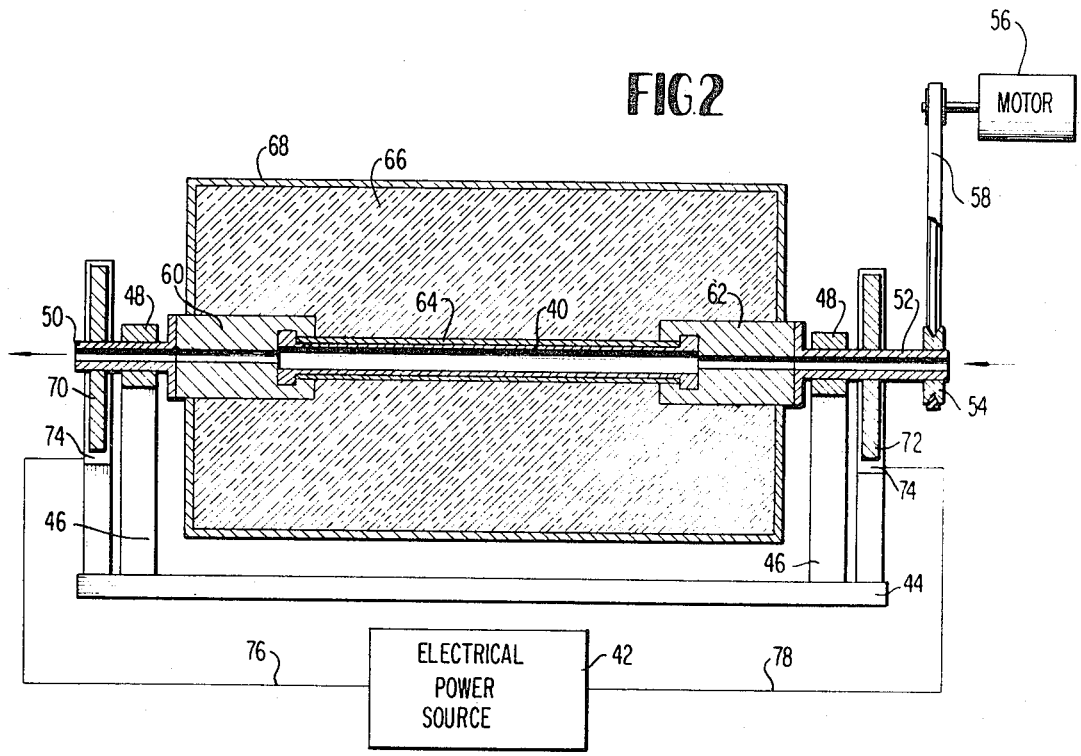
INVENTOR
ARISTID V. GROSSE
BY *Burns, Doane, Benedict, Swecker & Mathis*
ATTORNEYS 3,682,775
METHOD FOR HEATING HYDROGEN GAS
Aristid V. Grosse, Haverford, Pa., assignor to Reynolds
Metals Company, Richmond, Va.
Filed Oct. 11, 1968, Ser. No. 766,799
Int. Cl. G21c 19/00
U.S. Cl. 176—40                 10 Claims

ABSTRACT OF THE DISCLOSURE

To reduce degradation of refractory carbides exposed at high temperatures to hydrogen gas, such as in a furnace or nuclear reactor environment, a hydrocarbon which is gaseous at that temperature is admixed with the hydrogen. Suitable hydrocarbons include methane, ethylene, and acetylene.

BACKGROUND OF THE INVENTION

This invention relates to the creation and utilization of high temperature hydrogen gas, and more particularly, to an improved method for heating hydrogen gas by contact with a refractory carbide at high temperature.

The desirability of creating and utilizing a stream of high temperature gas is well recognized in several fields including propulsion of rockets (Astronautics & Aeronautics, January 1966, pp. 54–59, and March 1966, pp. 68–72), generation of electric current by magneto-hydrodynamics (U.S. Pat. No. 3,210,642), and melting and reacting materials (U.S. Pat. No. 3,257,196).

For example, the performance of a rocket engine in space depends in large part on the temperature and molecular weight of the exhaust gas according to the equation $$I_{sp} = k\sqrt{\frac{T}{M}}$$

wherein $I_{sp}$ is the specific impulse (e.g., pounds of thrust per pound of fuel utilized per second), T is absolute temperature in °K, M is the average molecular weight of the exhaust gas and $k$ is a constant which depends on the design of the particular rocket nozzle. Since extremely high temperature and low molecular weight can produce a high specific impulse, hydrogen gas heated to very high temperature has been suggested previously as an ideal space propellant.

One way which has been suggested for creating the extremely high tmeperature, say 5000° K, in the exhaust gas of a hydrogen rocket is to pass the hydrogen through the core of a specially constructed nuclear reactor or furnace. The fuel in such a reactor would be molten, and the particular construction of the reactor would be directed toward containing the molten fuel while providing for effective transfer of heat to the hydrogen stream. Broadly, such a nuclear reactor can comprise a tube or drum rotating about its axis, a layer of molten nuclear fuel held against the inner surface of the tube by centrifugal force and means for introducing the hydrogen into the tube so as to flow axially therethrough (Science, vol. 140, No. 3568, pp. 781–789, May 1963).

Further, my copending application Ser. No. 686,924, filed Nov. 30, 1967, now Pat. 3,536,818, dated Oct. 27, 1970, describes and claims improved forms of reactors and furnaces which have in one embodiment an innermost layer of refractory carbide for purposes such as reducing the rate of evaporation of the nuclear fuel into the hydrogen gas stream.

Moreover, as disclosed in copending application S.N. 706,590, filed Feb. 19, 1968, filed in the names of Lowell L. Wood and Carl A. Jensen, refractory carbides alone may serve as the material for the walls of a tubular electrical resistance furnace through which hydrogen gas may be passed to be heated.

A problem occurs, however, when hydrogen gas is heated by exposing the gas to a refractory carbide at an elevated temperature, e.g., above about 2000° K. At these temperatures, the refractory carbides will degrade and, essentially, lose their carbon to the hydrogen-containing atmosphere. It is thought that the carbon combines chemically with the hydrogen, perhaps in forms possessing only transient stability, thus causing continuous chemical changes and depleting the carbon component of the solid or liquid refractory carbide.

SUMMARY OF THE INVENTION

Accordingly, a primary object of the present invention is to reduce degradation of refractory carbides exposed at high temperatures to hydrogen gas.

Another object of the present invention is to improve the useful lives of furnaces or nuclear reactors having refractory carbide walls exposed at high temperatures to hydrogen-containing atmospheres.

These and other objects of the present invention will become more apparent from the following more detailed description.

In accordance with the present invention, the processes wherein refractory carbides are exposed to hydrogen atmospheres at high temperatures are improved by admixing one or more hydrocarbons with the hydrogen whereby degradation of the refractory carbide is eliminated or substantially reduced.

In another aspect of the invention, the method further comprises conducting the gaseous mixture of hydrogen and hydrocarbon through a tubular structure having a wall of refractory carbide maintained at an elevated temperature.

In yet another aspect of the invention, the method further comprises heating the tubular refractory carbide wall above its melt temperature while maintaining a retaining outer wall of the tubular structure at a temperature at which it is solid while concurrently rotating the overall tubular structure at a speed at which the molten carbide is held against the outer solid wall by centrifugal force.

BRIEF DESCRIPTION OF THE DRAWINGS

FIG. 1 is a schematic view partly in section of one form of heating apparatus suitable for carrying out the process of the present invention; and FIG. 2 is an elevational view in section of a barrel and frame for an electrical liquid pipe apparatus suitable for carrying out the process of the present invention.

DESCRIPTION OF THE PREFERRED EMBODIMENTS

FIG. 1 illustrates schematically an installation suitable for carrying out the process of the present invention with a stationary tubular resistance heater. As shown, the tubular heater includes a tube 10 constructed of a refractory carbide material, for example, tantalum carbide, which has a melting point of about 4200° C. The ends of the tube 10 are press fitted into graphite end caps 12 and 14 which are electrically connected by conductors 16 and 18 to an electrical power supply 20.

The hydrogen gas to be heated is conducted from holder 28 through regulator 30 into the resistance heating tube 10 through a delivery tube 22 which is press fitted into a central opening in the end cap 12. An electrically insulating ring 24 in the opening insulates the delivery tube 22 from the electric heating circuit. The other end cap 14 is provided with a central opening 26 through which the heated gas is discharged.

According to the present invention, the hydrogen gas to be exposed to the heated refractory carbide contains a gaseous hydrocarbon such as, for example, methane, ethylene, or acetylene, so that degradation of the refractory carbide wall will be eliminated or substantially reduced. Referring again to FIG. 1, a suitable methane gas generator 32 is employed to feed methane gas into the gas delivery tube 22.

FIG. 2 illustrates another form of apparatus suitable for heating a hydrogen gas stream to temperatures greater than the melting point of the inner wall of a tubular resistance heater. In this construction a tube or pipe is rotated about its own axis at a speed such that centrifugal force forms molten or liquid material in the tube into a layer on the inner surface of the tube, and resistance heating is obtained by passing electric current through the molten layer. Since it is known (Science, May 1963) that metals can be heated to temperatures approaching their critical temperatures in this type of "liquid pipe" furnace, it follows that a gas stream passed through the liquid pipe will be heated to very high temperatures by radiation from the hot molten layer.

Referring to FIG. 2, the heating source is an electrical resistance refractory carbide material 40 such as, for example, tantalum carbide, that carries an electric current from a source 42 of electrical power. The apparatus has a base 44 and a pair of supports 46 with journls 48 through which the ends of shafts 50 and 52 of conductive material are mounted for rotation. Pulley 54 is shown on shaft 52 and rotational force may be provided as by motor 56 and belt 58.

A pair of blocks 60 and 62 of a material such as graphite, which is both heat resistant and electrically conductive, may be joined to turn with the shafts 50 and 52. Extending between blocks 60 and 62 is a pipe which comprises two layers 40 and 64. Layer 40 is the electrically conducting carbide layer, for example, tantalum carbide, and layer 64 an electrically non-conducting material. The blocks 60 and 62 are provided with bores which are of slightly smaller diameter than the inside of the refractory carbide tube 40 so that the blocks may be capable of centrifugally retaining the carbide when it is maintained in a molten condition by the electric current passing therethrough. Outside pipe 64, a suitable body 66 of thermal insulation may be provided that is held in place, as by a cylindrical frame 68.

Near the ends of shafts 50 and 52, slip ring connections 70 and 72, capable of carrying high current densities, are provided. These may take the form of copper discs which contact a liquid metal pool 74, and the two pools may be connected by leads 76 and 78 to opposite terminals of power source 42.

The hydrogen gas to be heated is mixed with a hydrocarbon such as methane, ethylene or acetylene to reduce its effect on the molten refractory carbide walls, and the mixture is introduced through the bore of the shaft 52 such as by the same manner as described with reference to FIG. 1. Heating of the hydrogen gas stream takes place rapidly by absorption of the radiant energy being given off by the molten metal carbide layer 40. The heated hydrogen may be exhausted through the bore of shaft 50 for applications such as a general heat source or for carrying out chemical reactions requiring high temperatures.

While in both FIGS. 1 and 2 the refractory carbide walls are tubular, the present invention is not restricted thereto and is also applicable where the refractory carbide wall is planar or of other surface configuration.

Hydrocarbons suitable for the practice of the present invention include saturated and unsaturated aliphatic and aromatic hydrocarbons having from one to thirty or more carbon atoms.

Preferably, saturated and unsaturated aliphatic hydrocarbons having from 1 to 12 carbon atoms are used.

Exemplary of the preferred hydrocarbon atoms are methane, ethylene, and acetylene.

When operating at elevated temperatures contemplated in the present invention, e.g., above about 1500° K., and preferably from about 2000° K. to 5000° K. or higher, all of these hydrocarbons will normally be gaseous. Unsaturated hydrocarbons such as ethylene, butadiene, and acetylene, however, which have a higher carbon atom to hydrogen atom ratio than saturated hydrocarbons, are normally preferred when operating at lower temperatures, e.g., from about 1500° K. to about 2500° K.

While the optimum amount of hydrocarbon to be added to the hydrogen gas will vary according to the specific system, e.g., with the type or types of carbide, and the temperatures encountered, about 0.1% to about 10%, by volume of hydrogen, of hydrocarbon may be used.

For example, experiments have shown that when hydrogen gas is passed in contact with tantalum carbide at temperatures ranging from 2500° K. to 4500° K., the tantalum carbide converts to tantalum metal.

However, similar experiments have shown that, with the addition of only 4 volume percent methane to the hydrogen gas, the tantalum carbide does not convert to tantalum metal, and if tantalum metal is present, it will convert to tantalum carbide.

Similar results may be obtained with other refractory carbides such as the uranium carbides, e.g., UC, $UC_2$, and $U_2C_3$.

The term "refractory carbide" as used herein generally includes those carbides of the elements found in Groups IV$b$, V, VI$b$, VII$b$, and VIII$b$ of the Mendeleev Periodic Table.

Exemplary refractory carbides include the uranium carbides, tantalum carbide, niobium carbide, tungsten carbide, molybdenum carbide, zirconium carbide, thorium carbide and plutonium carbide. Moreover, any fissionable forms of the above carbides, such as $U^{235}C_2$, are also contemplated in the present invention, e.g., in nuclear reactor environments.

The invention may be embodied in other specific forms without departing from the spirit or essential characteristics thereof. The present embodiments are, therefore, to be considered in all respects as illustrative and not restrictive, the scope of the invention being indicated by the appended claims rather than the foregoing description, and all changes which come within the meaning and range of equivalency of the claims are therefore intended to be embraced therein.

I claim:

1. In a process wherein a refractory carbide is exposed to an atmosphere of hydrogen at a temperature above about 1500° K., the improvement which comprises introducing a hydrocarbon into the atmosphere in an amount of about 0.1% to 10% by volume of hydrogen, whereby degradation of the refractory carbide is reduced.

2. The process of claim 1 wherein the hydrocarbon is selected from the group consisting of saturated and unsaturated aliphatic hydrocarbons having from 1 to 12 carbon atoms.

3. The process of claim 2 wherein the refractory carbide is selected from the group consisting of the carbides of the elements of Groups IV$b$, V$b$, VI$b$, VII$b$, and VIII$b$ of the Periodic Table.

4. The process of claim 3 wherein the carbide is a carbide of uranium, and the hydrocarbon is selected from the group consisting of methane, ethylene and acetylene.

5. The process of claim 3 wherein the carbide is tantalum carbide, and the hydrocarbon is methane.

6. A process for heating hydrogen gas comprising contacting a mixture of hydrogen and about 0.1% to 10% by volume of hydrogen of a hydrocarbon with a refractory carbide surface maintained at a temperature above about 1500° K.

7. The process of claim 6 which further comprises conducting the mixture through a tubular structure having an innermost wall of refractory carbide.

8. The process of claim 7 which further comprises heating the carbide wall above its melt temperature while maintaining a retaining outer wall of the tubular structure at a temperature at which it is solid, while concurrently rotating the tubular structure at a speed at which the molten carbide is held against the outer solid wall by centrifugal force.

9. The process of claim 9 wherein the hydrocarbon is selected from the group consisting of saturated and unsaturated aliphatic hydrocarbons having from 1 to 12 carbon atoms.

10. The process of claim 9 wherein the carbide is selected from the group consisting of uranium and tantalum carbides, and the hydrocarbon is selected from the group consisting of methane, ethylene, and acetylene.

References Cited
UNITED STATES PATENTS

| | | | |
|---|---|---|---|
| 2,958,637 | 11/1960 | Voorhees | 176—39 |
| 3,250,590 | 5/1966 | Petkus et al. | 23—349 |
| 3,266,875 | 8/1966 | Romeo | 23—349 |
| 3,426,533 | 2/1969 | Grey et al. | 176—39 |

REUBEN EPSTEIN, Primary Examiner

U.S. Cl. X.R.

176—39, 92, 38; 23—349, 208; 13—35; 165—2

UNITED STATES PATENT OFFICE
CERTIFICATE OF CORRECTION

Patent No. 3,682,775             Dated August 8, 1972

Inventor(s) Aristid V. Grosse

It is certified that error appears in the above-identified patent and that said Letters Patent are hereby corrected as shown below:

Column 3, Line 27, delete "journls" and insert --journals--.

Claim 9, Line 1, delete "9" and insert --8--.

Signed and sealed this 2nd day of January 1973.

(SEAL)
Attest:

EDWARD M. FLETCHER, JR.             ROBERT GOTTSCHALK
Attesting Officer                     Commissioner of Patents